US 8,213,549 B2

(12) United States Patent
Heikkila

(10) Patent No.: US 8,213,549 B2
(45) Date of Patent: Jul. 3, 2012

(54) APPARATUS, COMPUTER PROGRAM AND METHOD FOR DETERMINING A SYMBOL ESTIMATE

(75) Inventor: Markku J. Heikkila, Oulu (FI)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 12/082,542

(22) Filed: Apr. 11, 2008

(65) Prior Publication Data

US 2009/0141820 A1 Jun. 4, 2009

(30) Foreign Application Priority Data

Nov. 30, 2007 (FI) ...................................... 20075864

(51) Int. Cl.
*H04L 27/06* (2006.01)
(52) U.S. Cl. ........ 375/340; 375/260; 375/262; 375/267; 375/299; 375/316; 375/341; 375/347; 455/101; 455/132; 455/296; 455/500; 455/562.1; 714/794; 714/795; 714/796; 370/208; 370/210; 370/334; 341/174
(58) Field of Classification Search .................. 375/260, 375/262, 267, 299, 316, 340, 341, 347; 455/101, 455/132, 296, 500, 562.1; 714/794, 795, 714/796; 370/208, 210, 334; 341/174
See application file for complete search history.

(56) References Cited

U.S. PATENT DOCUMENTS

| 7,154,936 | B2 * | 12/2006 | Bjerke et al. ................. 375/148 |
| 7,668,125 | B2 * | 2/2010 | Kadous .......................... 370/310 |
| 7,701,917 | B2 * | 4/2010 | Mantravadi et al. .......... 370/343 |
| 7,724,838 | B2 * | 5/2010 | Mantravadi ................... 375/295 |

OTHER PUBLICATIONS

Office Action and English translation thereof dated Aug. 2, 2011 from Korean Application No. 10-2010-7014378, 4 pages.
Office Action and English translation thereof dated Jan. 6, 2012 from Korean Application No. 10-2010-7014378, 4 pages.

* cited by examiner

*Primary Examiner* — Leon Flores
(74) *Attorney, Agent, or Firm* — Squire Sanders (US) LLP

(57) ABSTRACT

An apparatus for determining a symbol estimate includes a detection unit, an information storage, a channel decoder, and an estimator. One or more detectors of the detection unit is configured to detect a first data stream and the one or more detectors or one or more other detectors are configured to detect a second data stream when interference cancellation is carried out and when interference cancellation is not carried out parallel to detection of a first data stream to obtain results of detection. The information storage is configured to store the results of the detection of the second data stream, and the channel decoder is configured to channel decode a detected first data stream. The estimator is configured to determine a symbol estimate by using the stored results of the detection of the second data stream and based on the success of the channel decoding of the first data stream.

26 Claims, 2 Drawing Sheets

APPARATUS, COMPUTER PROGRAM AND METHOD FOR DETERMINING A SYMBOL ESTIMATE

FIELD

The invention relates to an apparatus, computer program and method for determining a symbol estimate.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The interference-limited nature of CDMA systems results from the receiver design: reception is typically based on a spreading code matched filter (MF) or a correlator. Since the received spreading codes are usually not completely orthogonal, multiple access interference (MAI) is present in the receiver.

Sub-optimal multi-user receivers have been developed for fighting multiple access interference. Multi-user receivers can be categorized in several ways, where one is to classify the receivers to two main classes: linear equalizer and subtractive interference cancellation (IC) receivers. Linear equalizers, for example zero-forcing (ZF), de-correlating detectors or minimum mean square error (MMSE) detectors, are linear filters suppressing multiple access interference. The principle of an IC receiver is that the multiple access interference component is estimated, and then subtracted from the received signal for making decisions more reliable. Multiple access interference cancellation can be carried out by using serial interference cancellation (SIC) detectors.

Multiple-input and multiple-output (MIMO) refers to systems using multiple antennas both at a transmitter and receiver to improve the performance of radio communication systems.

A conventional channel decoder aided SIC detector detects MIMO data streams successively. Because of a channel decoding delay, the SIC detector buffers received signal samples, corresponding channel and noise variance or noise covariance estimates, which demands large signal buffers.

SUMMARY OF SOME EXAMPLES OF THE INVENTION

Some aspects of the present invention are disclosed in the attached independent claims, and various embodiments of the invention are disclosed in the dependent claims. The following summary is intended to be exemplary and non-limiting to the invention.

According to an example aspect of the invention, an apparatus includes a detection unit including at least one detector, an information storage, a channel decoder, and an estimator. The one or more detectors of the detection unit are configured to detect a first data stream and one or more of the same detectors or one or more other detectors of the detection unit are configured to detect a second data stream when interference cancellation is carried out and when no interference cancellation is carried out parallel to the detection of the first data stream to obtain results of detection. The information storage is configured to store the results of the detection of the second data stream. The channel decoder is configured to channel decode the detected first data stream, and the estimator is configured to determine a symbol estimate by using the stored results of the detection of the second data stream and based on the success of the channel decoding of the first data stream.

Another example aspect of the invention is directed to a method. The method includes detecting a first data stream and detecting a second data stream. The second data stream is detected when interference cancellation is carried out and when no interference cancellation is carried out parallel to the detection of the first data stream to obtain results of detection. The method further includes storing the results of the detection of the second data stream and channel decoding the detected first data stream. A symbol estimate is determined using the stored results of the detection of the second data stream and based on the success of the channel decoding of the first data stream.

Another example aspect of the invention is directed to an apparatus. The apparatus includes means for detecting a first data stream and means for detecting a second data stream when interference cancellation is carried out and when no interference is carried out parallel to the detection of a first data stream to obtain results of detection. The apparatus also includes means for storing the results of the detection of the second data stream and means for channel decoding the detected first data stream. Also, the apparatus has means for determining a symbol estimate by using the stored results of the detection of the second data stream and based on the success of the channel decoding of the first data stream.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server, corresponding component, and/or to any communication system or any combination of different communication systems that support required functionality. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Many different radio protocols to be used in communications systems exist. Some examples of different communication systems are the Universal Mobile Telecommunications System (UMTS) radio access network (UTRAN or E-UTRAN), Long Term Evolution (LTE, the same as E-UTRA), Wireless Local Area Network (WLAN), Worldwide Interoperability for Microwave Access (WiMAX), Bluetooth®, Personal Communications Services (PCS) and systems using ultra-wideband (UWB) technology.

Figure 1:
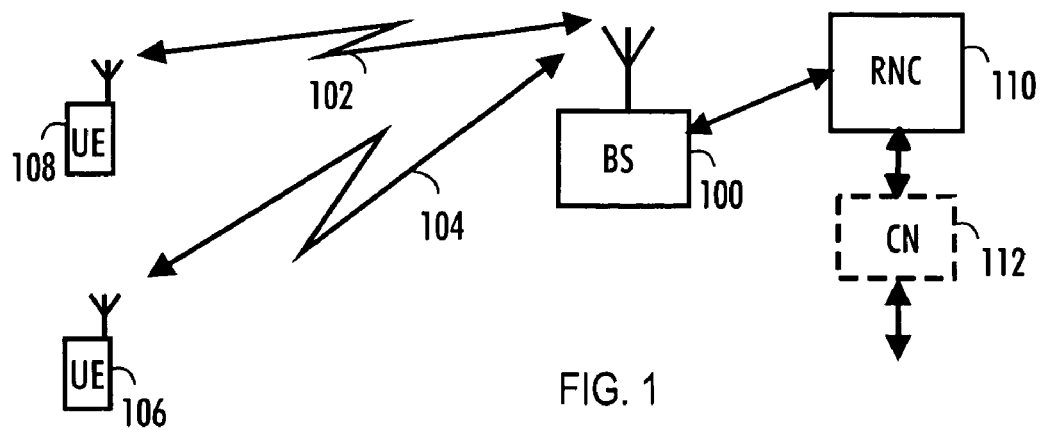
FIG. 1 illustrates an example of a communication system.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

FIG. 1 shows a part of a radio access network of E-UTRA.

The communications system is a cellular radio system which comprises a base station (or node B) 100, which has bi-directional radio links 102 and 104 to user devices 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching center (MSC), a media gateway (MGW) or a serving GPRS (general packet radio service) support node (SGSN), etc.

It should be noted that in future radio networks, the functionality of an RNC may be distributed among (possibly a subset of) base stations.

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

MIMO transmission typically applies two parallel data streams transmitted from different transmission antennas or transmission beams (this is sometimes called a pre-coded MIMO). These streams interfere with each other, which leads to the need of an advanced MIMO detector. More than two MIMO layers may also be provided. A conventional channel decoder aided SIC detector detects MIMO data streams successively as follows: a first MIMO stream is detected and channel decoded. The decoder output is used for regeneration of interference caused to a second data stream by the first data stream. After interference cancellation (IC), the second stream is detected. Typically, interference cancellation is performed only if decoding of the first data stream succeeded to avoid error propagation.

Alternatively, a soft interference cancellation may be performed by weighting bits or symbols used for regeneration of interfering signal elements according to their reliability. A conventional SIC detector typically applies arranging of MIMO streams according to their reliability, in which case a SIC detector detects first the MIMO stream having the highest reliability. The detection of remaining MIMO streams is carried out in the decreasing order of reliability. Reliability may be measured based on e.g. a post-detection of a signal-to-noise ratio, received signal power, or estimate of a frame or block error rate at the channel decoder output.

An embodiment of an improved SIC detector, however, pre-determines detector filters, such as linear Minimum Mean Square Error (LMMSE) filters, for a second MIMO data stream, corresponding LMMSE outputs and some required signal amplitudes parallel to the LMMSE detection of a first MIMO stream. Instead of storing original signal samples and MIMO channel coefficients and noise variance estimates, LMMSE filter outputs of the second MIMO data stream are stored. This saves memory, since LMMSE filter outputs are single complex values.

In an embodiment, interference cancellation for the second MIMO data stream is performed only after the first MIMO data stream is successfully decoded. Because during the detection of the first MIMO data stream it is not known whether the interference cancellation will be carried out or not, two LMMSE filter versions are required for the second MIMO data stream: one to be used in the case the first MIMO data stream is cancelled and another to be used in the case the first MIMO data stream is not cancelled.

After successful decoding, typically by using turbo-decoding, a SIC detector reads from a memory an output sample of a LMMSE filter version which assumes that interference cancellation will be carried out. The interference cancellation is then performed in order that regenerated interference can be subtracted from the LMMSE output (not form the original signal samples as conventionally).

In the case of an unsuccessful decoding, the SIC detector reads out an LMMSE output sample corresponding to the LMMSE filter version which assumes that no interference cancellation will be performed. Interference cancellation is not carried out and the read LMMSE output sample is used in demodulation.

It should be noticed that the term first MIMO data stream refers to a MIMO stream that is selected to be detected first in a SIC detector. It may be either layer 1 or 2 of a MIMO signal when the two MIMO layers (streams) are used.

Figure 2:
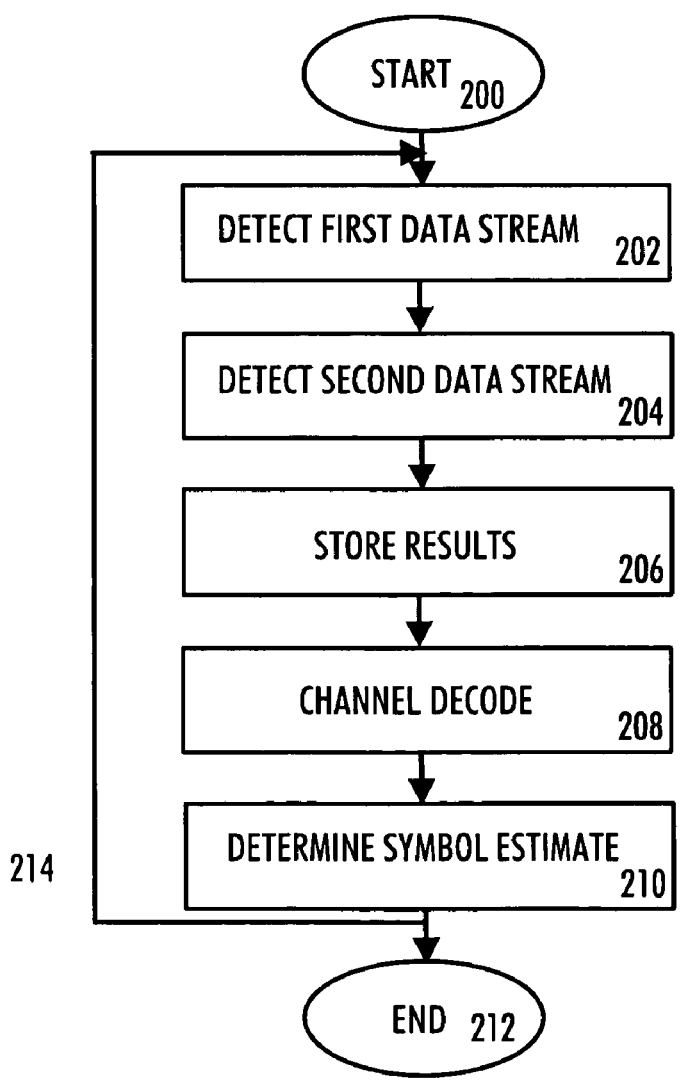
FIG. 2 is a flow chart.

Next, an embodiment is explained in further detail by means of FIG. 2. Presented principles may be applied to several kinds of communications systems, such as Orthogonal Frequency Division Multiplex (OFDM) or Orthogonal Frequency Division Multiplex Access (OFDMA) based communications systems or Code Division Multiple Access (CDMA) air-interface based systems. In CDMA or WCDMA based systems, detection and interference cancellation may be performed using chip-level (wideband) signals, in order a detector and interference canceller outputs estimates of chips, not symbols. A sequence of chips may be despread using a spreading code correlator to obtain a symbol estimate.

The embodiment begins in block 200.

In block 202, a first data stream is detected. Detection typically means the extraction of data from a carrier signal in a communication system.

The input signal vector of a SIC detector typically includes complex signal samples from each receive antenna and carries two unknown symbols (in the case of two MIMO data streams. If more data streams exist, the signal vector includes more symbols):

$$r(k)=h_1(k)s_1(k)+h_2(k)s_2(k)+\text{noise}, \quad (1)$$

wherein
$h_1(k)$ denotes a channel vector of a first symbol,
$s_1(k)$ denotes a first symbol,
$h_2(k)$ denotes a channel vector of a second symbol,
$s_2(k)$ denotes a second symbol, and
k denotes a sub-carrier index.

A channel vector should be understood in a broad sense: the vector may include effects of analog and digital transmission and reception filters, effects of beam-forming, preceding and transmission diversity, etc, in addition to the MIMO radio channel in question.

An LMMSE or interference rejection combiner (IRC) or other suitable filter for the detection of a first MIMO stream is denoted by $w_1(k)$. The SIC detector applies this filter for all selected sub-carriers for detecting a code word (typically turbo code) of stream 1:

$$\hat{s}_1(k)=w_1^H(k)r(k), \quad (2)$$

wherein
$w_1^H(k)$ denotes a conjugate transposed filter for the first MIMO stream,
H denotes conjugate transpose of a vector,
r(k) denotes a SIC detector input signal, and
k denotes a sub-carrier index, k=0, 1, ..., K, when K is an integer value <∞.

In the detection, the symbols are detected for sub-carriers k.

Regeneration of interference includes a method of regeneration of bits originally transmitted by a transmitter. This requires typically re-encoding, rate-matching and interleaving of the bits in the output of a channel decoder.

In block, 204, a second data stream is detected in a case interference cancellation is carried out and in a case no interference cancellation is carried out parallel to the detection of the first data stream to obtain results of detection. That is to say, the detection of a first data stream and the detection of a second data stream are typically carried out parallel to each other.

Symbol estimates $\hat{s}_1(k)$ include residual interference caused by a second MIMO data stream suppressed by means of antenna combining. In parallel to detection of the first MIMO data stream, the second stream is detected as follows:

1) the results of the detection of the second MIMO data stream in the case the channel decoding of the first MIMO data stream will not succeed in which case no interference cancellation will be carried out:

$$\hat{s}_{2,noIC}(k) = w_{2,noIC}^H(k)r(k) = \underbrace{(w_{2,noIC}^H(k)h_2(k))}_{A_{2,noIC}(k)}s_2(k) + \text{noise} \quad (3)$$

$$= A_{2,noIC}(k)s_2(k) + \text{noise},$$

wherein
$w_{2,noIC}^H(k)$ denotes a conjugate transposed filter for the second MIMO stream (no interference cancellation),
H denotes conjugate transpose of a vector,
r(k) denotes a SIC detector input signal,
$h_2(k)$ denotes a channel vector of a second symbol,
$s_2(k)$ denotes a second symbol,
$A_{2,noIC}(k)$ denotes symbol amplitude of a second MIMO data stream, when no interference cancellation will be carried out, and
k denotes a sub-carrier index, k=0, 1, ..., K, when K is an integer value <∞.

2) the results of the detection of the second MIMO data stream in the case the channel decoding of the first MIMO data stream will succeed in which case interference cancellation will be carried out:

$$\hat{s}_{2,IC}(k) = w_{2,IC}^H(k)r(k) \quad (4)$$

$$= \underbrace{(w_{2,IC}^H(k)h_2(k))}_{A_{2,IC}(k)}s_2(k) + \underbrace{(w_{2,IC}^H(k)h_1(k))}_{A_{21,IC}(k)}s_1(k) + \text{noise},$$

$$= A_{2,IC}(k)s_2(k) + A_{21,IC}(k)s_1(k) + \text{noise},$$

wherein
$w_{2,IC}^H(k)$ denotes a conjugate transposed filter for the second MIMO stream (interference cancellation performed),
H denotes conjugate transpose of a vector,
r(k) denotes a SIC detector input signal,
$h_2(k)$ denotes a channel vector of a second symbol,
$h_1(k)$ denotes a channel vector of a first symbol,
$s_2(k)$ denotes a second symbol,
$s_1(k)$ denotes a first symbol,
$A_{21,IC}(k)$ denotes symbol amplitude of a first MIMO data stream modeling interference caused by a first MIMO data stream and when interference cancellation will be carried out,
$A_{2,IC}$ denotes symbol amplitude of a second MIMO data stream when interference cancellation is carried out, and
k denotes a sub-carrier index, k=0, 1, ..., K, when K is an integer value <∞.

In the detection, the symbols are detected for sub-carriers k. All other amplitude values except $A_{21,IC}$ are real-valued.

When decoding of a first MIMO stream does not succeed and thus interference cancellation will not be performed, a detector filter for a second MIMO stream is determined in such a way that the filter itself suppresses the interference from the first MIMO stream. When decoding of a first MIMO stream succeeds allowing reliable interference cancellation, the detector filter for a second MIMO stream need not take into account interference from the first MIMO stream.

In block 206, results of the detection of the second data stream are stored.

The results to be stored are $\hat{s}_{2,noIC}(k)$, $\hat{s}_{2,IC}(k)$, $A_{2,noIC}(k)$, $A_{2,IC}(k)$ and $A_{21,IC}(k)$.

The results are determined and stored for sub-carriers k. The results are typically stored in a memory buffer.

In block 208, the symbols are channel decoded. The channel decoded data is used to regenerate interference caused to symbols of the second MIMO data stream.

Channel coding usually refers to forward error correction coding and bit interleaving in a transmitter. Channel coding is typically used to protect data in a radio path in the presence of noise and interference. Channel decoding removes channel coding in a receiver. Thus, the method of carrying out the channel decoding depends on a selected channel coding. The embodiment does not restrict the selection of a channel coding method.

In block 210, a symbol estimate is determined by using the stored results of the detection of the second data stream and based on the success of the channel decoding of the first data stream.

If channel decoding of the first MIMO data stream is successful, a symbol estimate from which interference is subtracted may be determined as follows:

$$\tilde{s}_{2,IC}(k)=\tilde{s}_{2,IC}(k)-A_{21,IC}(k)\hat{s}_1(k), \quad (5)$$

wherein $\tilde{s}_{2,IC}(k)$, $A_{21,IC}(k)$ are obtainable from the memory, $\hat{s}_1(k)$ is a symbol of a first MIMO stream regenerated based of decoded data of the first MIMO data stream, and k denotes a sub-carrier index, k=0, 1, ..., K, when K is an integer value <∞.

If the channel decoding fails no symbol estimate for the first MIMO data stream is provided and a symbol estimate without interference cancellation may be determined as follows:

$$\hat{s}_{2,IC}(k)=\tilde{s}_{2,noIC}(k), \quad (6)$$

wherein $\tilde{s}_{2,noIC}(k)$ is obtainable from the memory.

The embodiment ends in block 212. Arrow 214 depicts one possibility to repeat the embodiment. The repetition will involve cancellation of interference from the second MIMO stream to the first MIMO stream which is then detected again.

It should be noticed that, typically, the output of block 204 (a detected second data stream) is used for interference cancellation after which the second MIMO stream is decoded.

The steps/points, signaling messages and related functions described above in connection to FIG. 2, are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For a firmware or software, implementation can be through modules of at least one chip set (e.g., procedures, functions, and so on) that perform the functions described herein. The software codes may be stored in memory unit and executed by the processors.

Figure 3:
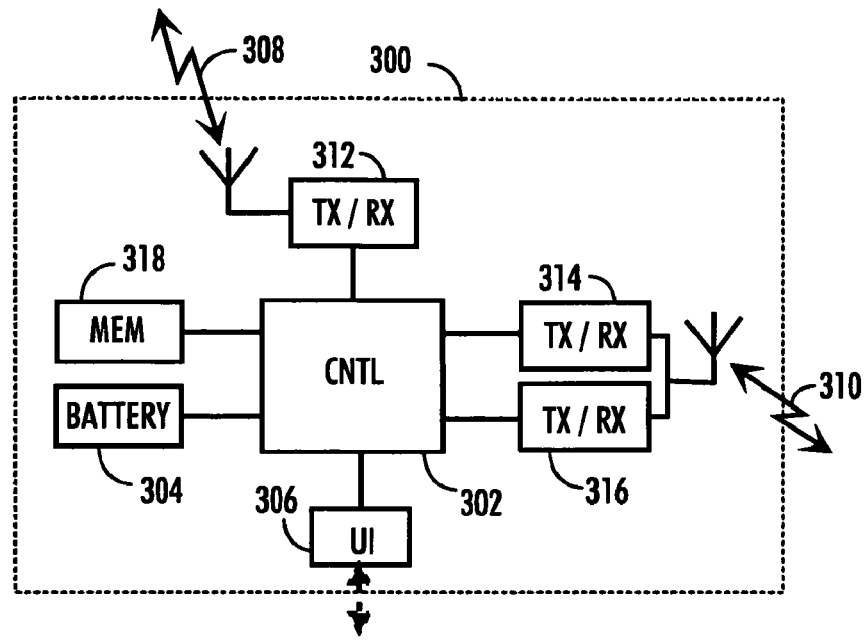
FIG. 3 illustrates an example of a communication device.

FIG. 3 is a block diagram of an apparatus according to an embodiment of the invention. Although the apparatus has been depicted as one entity, different modules and memory may be implemented in one or more physical or logical entities. The apparatus is a communication device providing support for a plurality of different radio protocols. The embodiments are not, however, restricted to the device given as an example but a person skilled in the art may apply the solution to other devices provided with the necessary properties. The communication device is depicted in FIG. 3 in a simplified manner.

The communication device may be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone. It should be noticed that the communication device may also include characteristics of several devices, such as a computer capable of offering wireless data or speech transfer services.

The communication device of the example includes a plurality of communication interfaces 312 to 316 to provide wireless radio connections 308, 310 to other devices, such as base stations. The communication interfaces typically include at least one transceiver. The communication interfaces 312 to 316 usually provide connections employing different radio access technologies. It is obvious for a person skilled in the art that the number of communication interfaces may vary from one implementation to another.

The communication device of the example further includes a control unit 302 to control functions of the device 300. The control unit 302 comprises means for creating radio connections between the communication device 300 and other communication devices or networks. The control unit 302 also comprises means for controlling a number of simultaneous radio connections in the communication device. The control unit may be configured to perform at least partly embodiments of the invention, such as detecting a first data stream, detecting a second data stream in a case interference cancellation is carried out and in a case no interference cancellation is carried out parallel to the detection of the first data stream to obtain results of detection, storing the results of the detection of the second data stream, channel decoding the detected first data stream and determining a symbol estimate by using the stored results of the detection of the second data stream, the determination being based on the success of the channel decoding of the first data stream.

The control unit 302 may include one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof, as described above.

The control unit is coupled to a memory unit 318 to which for instance results of detection may be stored. The memory unit acts in this embodiment as information storage. The memory unit may be implemented within a processor or external to the processor, in which case it can be communicatively coupled to the processor via various means as is known in the art. Additionally, components of systems described herein may be rearranged and/or complimented by additional components in order to facilitate achieving the various aspects, etc., described with regard thereto, and are not limited to the precise configurations set forth in given Figures, as will be appreciated by one skilled in the art.

The communication device typically comprises a battery 304 for power supply.

The communication device 300 further comprises a user interface 306 connected to the controlling unit. The user interface 306 may comprise a keyboard, a microphone, a loudspeaker, a display, and/or a camera.

It is obvious to a person skilled in the art that the communication device may include parts not depicted in FIG. 3.

Figure 4:
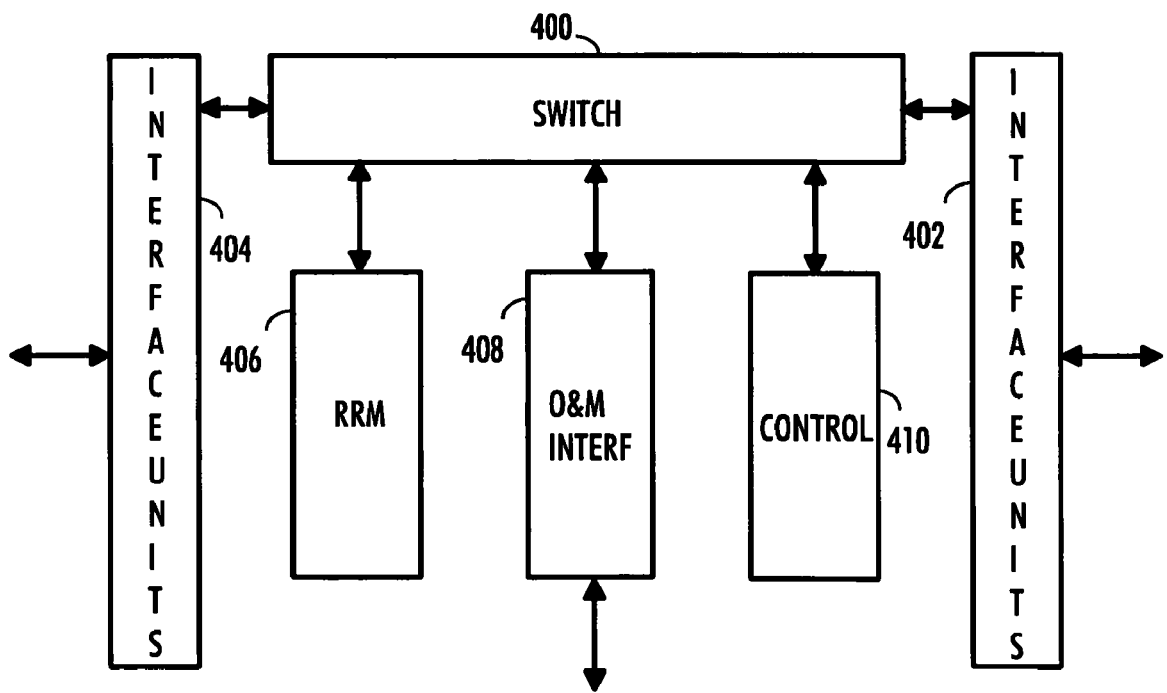
FIG. 4 illustrates an example of a node of a communication system.

The apparatus may also be any node or a host of a communication network. Referring to FIG. 4, a simplified block diagram illustrates an example of a logical structure of a node of a communication system.

The node may be the switching and controlling element of SAE/LTE (Long Term Evolution (LTE), System Architecture Evolution (SAE)) or other radio access networks.

Switching 400 takes care of connections between a core network and a user device. The node is in connected to other parts of a network via interface units 402, 404.

The functionality of the node may be classified into radio resource management 406 and control functions 410. An operation and management interface function 408 serves as a medium for information transfer to and from management functions.

Radio resource management is a group of algorithms for sharing and managing a radio path connection so that the quality and capacity of the connection are adequate. The radio resource management also carries out functions needed for transmitting and receiving radio signals, such as radio frequency and base band functions.

The control functions take care of functions related to set-up, maintenance and release of a radio connection between the radio network element and user devices.

Embodiments of the method described above may be carried out by the radio resource management functions.

The precise implementation of the node is vendor-dependent.

An embodiment provides a computer program embodied on a distribution medium, comprising program instructions which, when loaded into an apparatus, constitute the apparatus as explained above.

The computer program may be in a source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

It will be obvious to a person skilled in the art that, as technology advances, the inventive concept can be implemented in various ways. The invention and its embodiments are not limited to the examples described above but may vary within the scope of the claims.

That which is claimed is:

1. An apparatus comprising:
    a detection unit comprising at least one detector;
    one or more detectors of the detection unit configured to detect a first data stream and one or more of the same detectors or one or more other detectors of the detection unit configured to detect a second data stream in a case interference cancellation is carried out and in a case no interference cancellation is carried out parallel to the detection of the first data stream to obtain results of detection;
        an information storage configured to store the results of the detection of the second data stream;
        a channel decoder configured to channel decode the detected first data stream; and
        an estimator configured to determine a symbol estimate by using the stored results of the detection of the second data stream, and based on the success of the channel decoding of the first data stream.

2. The apparatus of claim 1, the detection unit comprising one or more detectors configured to detect a first data stream and the second data stream.

3. The apparatus of claim 1, the detection unit comprising one or more detectors configured to detect a first data stream and one or more other detectors to detect the second data stream.

4. The apparatus of claim 1, wherein the data streams are Multiple-Input-Multiple-Output data streams.

5. The apparatus of claim 1, wherein the results of detection are at least one of: results of the detection of the second data stream in the case the channel decoding of the first data stream does not succeed in which case no interference cancellation is carried out, results of the detection of the second data stream in the case the channel decoding of the first data stream succeeds in which case interference cancellation is carried out, symbol amplitude of a symbol of the first data stream when interference cancellation is carried out, symbol amplitude of the second data stream when no interference cancellation is carried out, and symbol amplitude of the second data stream when interference cancellation is carried out.

6. The apparatus of claim 1, the estimator further configured to carry out the determination of a symbol estimate by selecting as a symbol estimate the result of detection of the second data stream detected without interference cancellation.

7. The apparatus of claim 1, the estimator further configured to carry out the determination of a symbol estimate by subtracting from the result of detection of the second data stream in the case interference cancellation is carried out regenerated interference, wherein the regeneration is carried out based on an amplitude of an interference symbol.

8. The apparatus of claim 1, the apparatus being a communication device.

9. The apparatus of claim 1, the apparatus being a node.

10. The apparatus of claim 1, the apparatus being a chip set.

11. The apparatus of claim 1, the apparatus being a module.

12. A method comprising:
    detecting a first data stream;
    detecting a second data stream in a case interference cancellation is carried out and in a case no interference cancellation is carried out parallel to the detection of the first data stream to obtain results of detection;
    storing the results of the detection of the second data stream;
    channel decoding the detected first data stream; and
    determining a symbol estimate by using the stored results of the detection of the second data stream, and based on the success of the channel decoding of the first data stream.

13. The method of claim 12, wherein the data streams are Multiple-Input-Multiple-Output data streams.

14. The method of claim 12, wherein the results of detection are at least one of: results of the detection of the second data stream in the case the channel decoding of the first data stream does not succeed in which case no interference cancellation is carried out, results of the detection of the second data stream in the case the channel decoding of the first data stream succeeds in which case interference cancellation is carried out, symbol amplitude of a symbol of the first data stream when interference cancellation is carried out, symbol amplitude of the second data stream when no interference cancellation is carried out, and symbol amplitude of the second data stream when interference cancellation is carried out.

15. The method of claim 12, wherein the determination of a symbol estimate is carried out by selecting as a symbol estimate the result of detection of the second data stream detected without interference cancellation.

16. The method of claim 12, wherein the determination of a symbol estimate is carried out by subtracting from the result of detection of the second data stream in the case interference cancellation is carried out regenerated interference, wherein the regeneration is carried out based on an amplitude of an interference symbol.

17. A non-transitory computer readable medium storing a computer program comprising program instructions which, when executed by a processor of an apparatus, perform the method of claim 12.

18. An apparatus comprising:
   means for detecting a first data stream;
   means for detecting a second data stream in a case interference cancellation is carried out and in a case no interference cancellation is carried out parallel to the detection of the first data stream to obtain results of detection;
   means for storing the results of the detection of the second data stream;
   means for channel decoding the detected first data stream; and
   means for determining a symbol estimate by using the stored results of the detection of the second data stream, and based on the success of the channel decoding of the first data stream.

19. The apparatus of claim 18, wherein the data streams are Multiple-Input-Multiple-Output data streams.

20. The apparatus of claim 18, wherein the results of detection are at least one of: results of the detection of the second data stream in the case the channel decoding of the first data stream does not succeed in which case no interference cancellation is be carried out, results of the detection of the second data stream in the case the channel decoding of the first data stream succeeds in which case interference cancellation is to be carried out, symbol amplitude of a symbol of the first data stream when interference cancellation is carried out, symbol amplitude of the second data stream when no interference cancellation is carried out, and symbol amplitude of the second data stream when interference cancellation is carried out.

21. The apparatus of claim 18, further comprising means for carrying out the determination of a symbol estimate by selecting as a symbol estimate the result of detection of the second data stream detected without interference cancellation.

22. The apparatus of claim 18, further comprising means for carrying out the determination of a symbol estimate by subtracting from the result of detection of the second data stream in the case interference cancellation is carried out regenerated interference, wherein the regeneration is carried out based on an amplitude of an interference symbol.

23. The apparatus of claim 18, the apparatus being a communication device.

24. The apparatus of claim 18, the apparatus being a node.

25. The apparatus of claim 18, the apparatus being a chip set.

26. The apparatus of claim 18, the apparatus being a module.

* * * * *